United States Patent Office
3,518,281
Patented June 30, 1970

3,518,281
PRODUCTION OF 2,3-DIHYDROPYRAN
Dennis Charles Holtman, Cincinnati, Ohio, assignor to Emery Industries, Inc., Cincinnati, Ohio, a corporation of Ohio
No Drawing. Filed June 28, 1968, Ser. No. 740,861
Int. Cl. C07d 7/08
U.S. Cl. 260—345.1                    8 Claims

ABSTRACT OF THE DISCLOSURE

A process is provided for the production of 2,3-dihydropyran by catalytically converting tetrahydrofurfuryl alcohol to 2,3-dihydropyran in the vapor phase at a temperature of from about 200° to 375° C. using an eta alumina catalyst.

---

This invention relates to a process for the production of 2,3-dihydropyran. More particularly, it relates to a new and improved process for catalytically converting tetrahydrofurfuryl alcohol to 2,3-dihydropyran.

In the past, various vapor-phase catalytic processes have been proposed for the production of 2,3-dihydropyran. In these processes, tetrahydrofurfuryl alcohol vapors are heated to an elevated temperature and passed over a particular catalyst. Exemplary of catalysts that have been used in these processes with varying degrees of success are alumina, titania, thoria, vanadia, mixtures of two or more of the above, and the like.

Unfortunately, these prior art methods for the production of 2,3-dihydropyran have not been entirely satisfactory. The yields of these processes, for example, are considerably less than quantitative. operating temperatures are often excessive; and regeneration of the catalyst is time-consuming, expensive, and required frequently. Further, and because of the low conversion rate achieved in these processes, the dihydropyran product contains considerable amounts of unreacted tetrahydrofurfuryl alcohol.

It is therefore a primary object of this invention to provide a new and improved vapor-phase, catalytic process for the production of 2,3-dihydropyran from tetrahydrofurfuryl alcohol.

In accordance with this purpose, this invention provides a process for the production of 2,3-dihydropyran which comprises contacting tetrahydrofurfuryl acohol in the vapor-phase and at a temperature of at least about 200° C. with a catalyst containing eta alumina.

It is to be understood that both the foregoing general description and the following detailed description are exemplary and explanatory but are not restrictive of the invention.

The catalyst used to conveniently convert tetrahydrofurfuryl alcohol to 2,3-dihydropyran in high yields in accordance with the process of this invention is an eta alumina catalyst. Eta alumina is commercially available, for example, from the Davidson Chemical Company.

The eta alumina is available either as a coarse powder having screen analysis of 35% through 200 mesh or a fine powder having a screen analysis of 65% through 200 mesh. It is also available in a pellet form either as tablets or extrusions.

The eta alumina has volatiles at 1,750° F. of 3% by weight, a surface area of 230 sq. m./gm., and a bulk density of 35.4 lbs./cu. ft.

Preferably, the catalyst used in the process of this invention consists essentially of eta alumina, but minor amounts of other catalyst compounds can be mixed with the eta alumina, if desired. Such compounds include molybdenum oxide, vanadium pentoxide, titanium dioxide, and the like.

Preferably, the process of this invention is a continuous one in which tetrahydrofurfuryl alcohol in the vapor-phase is continuously passed through a heated reactor containing the eta alumina catalyst and converted to 2,3-dihydropyran.

In such a continuous process, tetrahydrofurfuryl alcohol is first vaporized at a temperature of about 300° C. and then passed through a heated reactor where it is contacted with the catalyst. The temperature of the reactor can vary widely from about 200° to 375° C. and, preferably, between about 225° to 315° C. to convert the alcohol vapors to the final product.

In accordance with the invention, the alcohol vapors are passed through the catalytic reactor at a flow rate of at least two (2) parts of alcohol per hour per part of catalyst. Flow rates of up to eight (8) parts of tetrahydrofurfuryl alcohol per hour per part of catalyst can, however, be successfully used in the process of this invention.

Residence time of the reactant stream in the reactor can vary widely, and generally is from about 2 to 20 seconds, with the residence time varying inversely with the temperature of the reactor. Preferred reactor residence times are from about 2 to 6 seconds.

In the reactor, the alcohol vapors are converted to dihydropyran vapors and water vapor. The product vapors are condensed and the resulting condensate passed through a separator where the water is removed from 2,3-dihydropyran. The dihydropyran portion of the condensate is then distilled to separate the dihydropyran product from unreacted alcohol.

The water portion of the condensate may also be distilled to recover any unreacted alcohol present in this portion of the condensate. The recovered alcohol is then returned to the reactor for further processing.

If desired, the vaporous tetrahydrofurfuryl alcohol can be passed into the reactor entrained in a carrier gas, such as nitrogen, argon, or any other nonoxidizing gas that is inert to the reaction. As shown in Example 1, however, the use of such a carrier gas is not required in the process of this invention. After condensation of the product vapors from the reactor, the recovered carrier gas may be recycled.

The eta alumina catalyst of this invention requires periodic regeneration. Regeneration is accomplished by discontinuing the feed of tetrahydrofurfuryl alcohol to the reactor, and passing air through the reactor at normal operating temperatures of preferably around 300° C. The effluent products of the regeneration are suitably vented to the atmosphere. Regeneration usually requires from about one (1) to two (2) hours of air treatment. Thus, the catalyst can be easily and quickly regenerated without the need for raising the temperature of the reactor above normal operating temperatures and without having to physically remove the catalyst from the reactor.

Preferably, two catalytic reactors are used so that the process can be truly continuous. Thus, while one reactor is in use, the catalyst can be regenerated in the other reactor.

To illustrate the invention more specifically, reference is now made to the following examples. These examples illustrate the preparation of 2,3-dihydropyran from tetrahydrofurfuryl alcohol. Purity of the product is determined by vapor-phase chromatography. In each example, the catalyst is employed in the form of extruded pellets prepared from fine eta alumina powder. The pellets are approximately one-eighth (⅛) inch in size.

EXAMPLE 1

Tetrahydrofurfuryl alcohol is vaporized and passed at atmospheric pressure through a bed of catalyst consisting of one (1) pound of eta alumina. The temperature of the catalyst is 315° C., and the alcohol vapors are passed through the catalyst at a rate of six (6) pounds of alcohol per hour per pound of catalyst.

After a total of 100 pounds of alcohol have been passed through the catalyst, no deterioration of the catalyst could be observed.

The gaseous reaction mixture leaving the reaction chamber is condensed giving two liquid phases; one of water and unreacted alcohol; and the other 2,3-dihydropyran and additional quantities of unreacted alcohol. These phases are separated and the dihydropyran-containing phase distilled to yield a distallate containing 99.9% of 2,3-dihydropyran. The amount of alcohol converted to dihydropyran is about 90% based on the theoretical amount obtainable.

When the activity of the catalyst decreases to a level that requires regeneration, the catalyst is maintained at 315° C. and air is passed over it at a rate of five (5) cubic feet per hour. Regeneration is complete after two (2) hours.

EXAMPLE 2

The process of Example 1 is repeated, except that tetrahydrofurfuryl alcohol is first entrained in a stream of helium at a ratio of two (2) pounds of alcohol per five (5) cubic feet of helium before the alcohol is vaporized. The bed of catalyst is maintained at a temperature of 225° C. and the flow rate is two (2) pounds of alcohol per hour per pound of catalyst. This is equivalent to a residence time of about 4.8 seconds.

The reactor gases leaving the reaction zone are condensed, separated, and distilled, in accordance with the procedure of Example 1. The distillate analyzes 99% dihydropyran and the amount of alcohol converted to 2,3-dihydropyran is about 90% based on the theoretical amount obtainable.

The invention in its broader aspects is not limited to the specific details shown and described and departures may be made from such details without departing from the principles of the invention and without sacrificing its chief advantages.

What is claimed is:

1. A process for the preparation of 2,3-dihydropyran which comprises contacting tetrahydrofurfuryl alcohol in the vapor phase and at a temperature of at least about 200° C. with a catalytic amount of an eta alumina catalyst.

2. The process of claim 1, in which the catalyst consists essentially of eta alumina.

3. The process of claim 1, in which the tetrahydrofurfuryl alcohol vapors are entrained in an inert carrier gas before being contacted with the catalyst.

4. The process of claim 3, in which the carrier gas is selected from a group consisting of helium, nitrogen, argon, and carbon dioxide.

5. The process of claim 1, in which the temperature of the alcohol vapors is from about 200° to 375° C.

6. The process of claim 5, wherein the temperature of the alcohol vapors is from about 225° to 315° C.

7. The process of claim 1, in which the tetrahydrofurfuryl alcohol vapors at a temperature of from about 290° to 375° C. are contacted with the catalyst at a rate of up to 8 parts of alcohol per hour per part of catalyst.

8. The process of claim 3, in which the alcohol vapors entrained in the carrier gas are contacted with the catalyst at a rate of at least about two parts of alcohol per hour per part of catalyst and at a temperature of from about 200° to 250° C.

References Cited

UNITED STATES PATENTS

| | | | |
|---|---|---|---|
| 2,365,623 | 12/1944 | Bremner et al. | 260—345.1 |
| 2,976,299 | 3/1961 | Manly | 260—345.1 |
| 3,240,790 | 3/1966 | Denton | 260—345.1 |

HENRY R. JILES, Primary Examiner

J. M. FORD, Assistant Examiner